United States Patent [19]

Fujisawa

[11] 4,439,778

[45] Mar. 27, 1984

[54] PEN TYPE PRINTING APPARATUS

[75] Inventor: Kyuichi Fujisawa, Tonan, Japan

[73] Assignee: Alps Electric Co., Ltd., Tokyo, Japan

[21] Appl. No.: 341,095

[22] Filed: Jan. 20, 1982

[30] Foreign Application Priority Data

Jan. 21, 1981 [JP] Japan ............................ 56-5857[U]

[51] Int. Cl.$^3$ ............................ G01D 15/24

[52] U.S. Cl. ............................ 346/136

[58] Field of Search .................. 346/33 EC, 136, 145

[56] References Cited

U.S. PATENT DOCUMENTS

| | | | |
|---|---|---|---|
| 2,884,299 | 4/1959 | Sandrock | 346/136 |
| 3,285,484 | 11/1966 | Johnson | 346/136 X |
| 3,519,117 | 7/1970 | Smith | 197/138 |
| 4,369,453 | 1/1983 | Brandt | 346/136 |

*Primary Examiner*—Donald A. Griffin

*Attorney, Agent, or Firm*—Guy W. Shoup; Gerard F. Dunne

[57] ABSTRACT

Disclosed is a pen type printing apparatus having a reduced size and weight suitable for use in combination with a personal computer or the like. The apparatus has a paper feed roller adapted to be driven by a motor. Two short roller shafts are arranged at each axial end of the paper feed roller so as to extend in parallel with the latter. These roller shafts rotatably carry respective pressing rollers of small diameters. The roller shafts are biased toward the paper feed roller to bring the pressing rollers into pressure contact with both axial end portions of the paper feed roller to clamp a printing paper therebetween. A carriage is movable transversely of the printing paper and carries a pen which is projectable selectively. Any desired character, symbol or a chart can be printed on the substantially mid-portion of the printing paper where no pressing roller exists, by a combination of the shifting of the carriage, feed of the paper and the projection of the pen, in accordance with a printing instruction.

12 Claims, 10 Drawing Figures

PEN TYPE PRINTING APPARATUS

BACKGROUND OF THE INVENTION

The present invention relates to a pen type printing apparatus such as a graphic printer or an alpha-numeric printer and, particularly, to a pen type printing apparatus which permits an easy confirmation of the printing state, stabilizes feeding of the printing paper and which has reduced size and weight so as to be suitable for use as printing apparatus used with a personal computer, various measuring systems and so forth.

Generally, in thermal printers, ink jet printers or the like, it is comparatively easy to reduce the weight of the carriage. In these printers, the data are printed in the form of fine dots, so that it is undeniable that the quality of printing is inferior to that of the pen type recorder in which the data are printed in the form of lines actually drawn by pens or the like. The thermal printer also has a disadvantage that the printing can be made only on a heat-sensitive paper. In addition, in ink jet printers, it is necessary to employ a comparatively complicated mechanism including a pump or the like to recycle the printing ink.

Under these circumstances, there is an increasing demand for a pen type printing apparatus having a carriage of a reduced size and weight.

It is also to be pointed out that printers hitherto proposed often suffer a common problem of feeding the recording paper in an unstable manner, as will be described later in more detail with reference to the drawings.

SUMMARY OF THE INVENTION

Accordingly, an object of the invention is to provide a small-sized pen type printing apparatus having a simplified construction and provided with a carriage of a reduced size and weight.

Another object of the invention is to provide a pen type printing apparatus in which the printing paper is fed stably.

To these ends, according to the invention, there is provided a pen type printing apparatus which includes a paper feed roller adapted to be rotatively driven by a motor, a pair of side plates rotatably holding both ends of the paper feed roller, upper and lower roller shafts of small length projected inwardly from each side plate so as to extend in parallel with the paper feed roller, both the upper roller shafts and both the lower roller shafts being coaxial, respectively, pressing rollers of a small diameter and carried by respective roller shafts, and spring means for biasing the pressing rollers into pressure contact with the paper feed roller. A printing paper can be clamped at both of its marginal edges between the paper feed roller and the pressing rollers, and a pen carried by a carriage movable transversely of the printing paper is adapted to make a printing operation by a combination of the shifting of the carriage, feeding of the printing paper and projection of the pen.

The above and other objects, as well as advantageous features of the invention will become clear from the following description of the preferred embodiment taken in conjunction with the accompanying drawings.

DESCRIPTION OF THE PREFERRED EMBODIMENTS

Before turning to the detailed description of the preferred embodiment, an explanation will be made hereinunder as to drawbacks of the paper feed mechanism of conventional printing apparatus, in order to facilitate understanding of the advantage brought about by the present invention.

Figure 1:
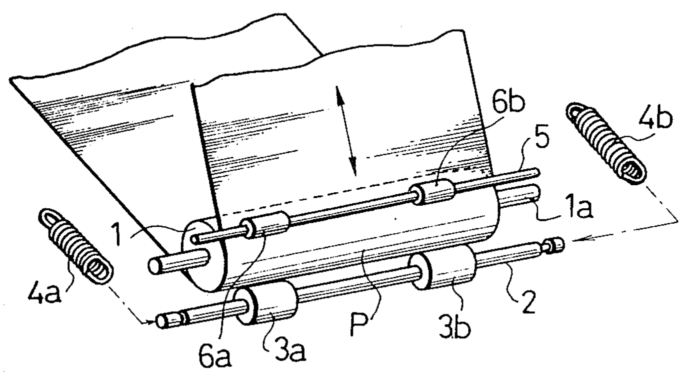
Fig. 1 PRIOR ART
FIG. 1 is a perspective view of a conventional paper feed mechanism.

FIG. 1 shows a paper feed mechanism commonly used in conventional printing apparatus. This paper feed mechanism has a paper feed roller 1 made of rubber and adapted to be driven by a motor (not shown). A roller shaft 2 extending in parallel with the paper feed roller 1 rotatably carries two pressing rollers **3*a*,3*b* and is biased by springs 4*a*,4*b* provided at both ends thereof so as to bring the pressing rollers 3*a*,3*b* into pressure contact with the paper feed roller 1. Another roller shaft 5 extended in parallel with the paper feed roller 1 and positioned above the roller shaft 2 carries retainer rollers 6*a*,6*a* which make slight contact with the surface of the paper feed roller 1**.

A printing paper P is clamped between the paper feed roller 1 and the pressing rollers **3*a*,3*b*, and is driven by the frictional force between the roller 1 and the paper P which is ensured by the springs 4*a*,4*b*. The printing paper P is pressed at its upper end by means of the retainer rollers 6*a*,6*b* so that the paper P is wrapped around the roller 1. The printing is made on the portion of the paper P wrapped partially around the roller 1, i.e. on the portion of the paper P between two roller shafts 2 and 5**.

This conventional paper feed mechanism has the following disadvantage. Namely, the roller shaft 5 and the retainer rollers **6*a*,6*a* positioned above the printing position inconveniently conceal the printed data when the printing paper P is shifted in the direction for printing on the next line, and confirmation of the data previously printed cannot be made easily. In addition, the surface of the printing paper P is often contaminated due to contact of the retainer rollers 6*a*,6*b* with the printed line immediately after the printing. Furthermore, the feeding of the paper is often rendered unstable because the feeding force is produced substantially by the force solely of two pressing rollers 3*a*,3*b* pressing the paper against the roller 1**.

These disadvantages, however, are completely overcome by the present invention, as will be understood from the following description of the preferred embodiment.

Figure 2:
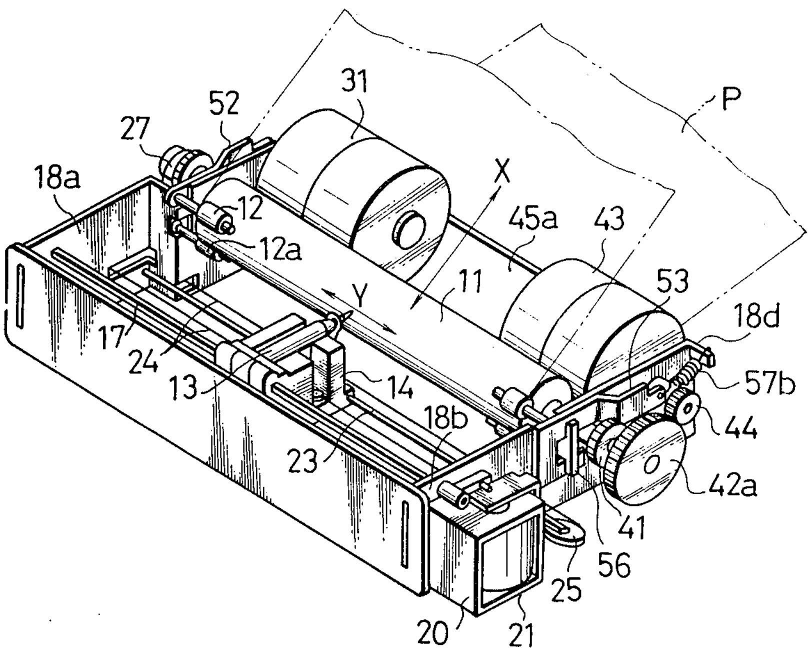
FIG. 2 is a perspective view of a pen type printing apparatus in accordance with an embodiment of the invention.
Figure 3:
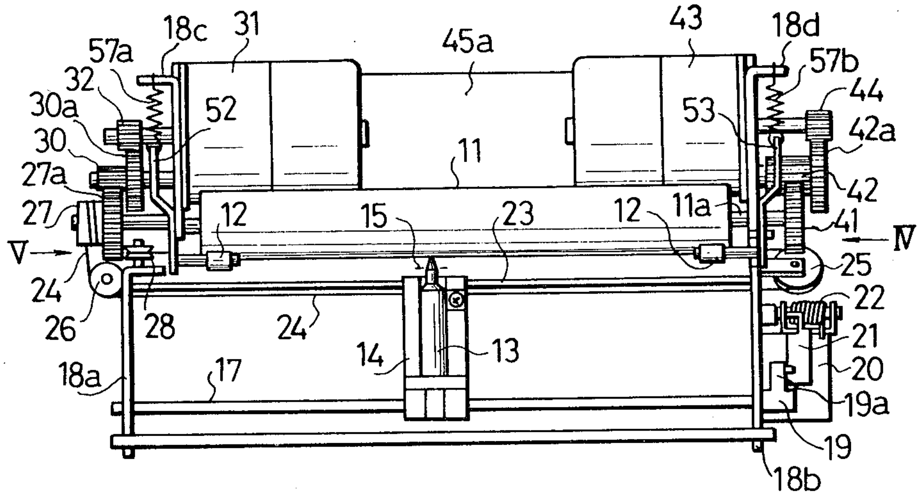
FIG. 3 is a plan view of the pen type printing apparatus shown in FIG. 2.
Figure 4:
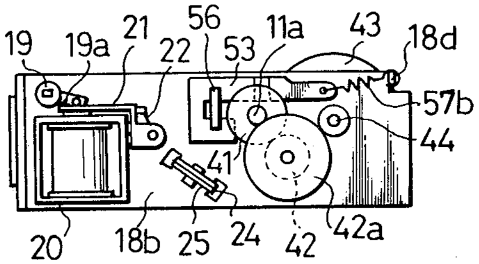
FIG. 4 is a right side elevational view of the printing apparatus shown in FIG. 2.
Figure 5:
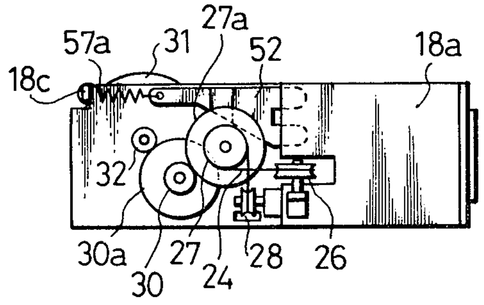
FIG. 5 is a left side elevational view of the printing apparatus shown in FIG. 2.

FIG. 2 is a perspective view of a pen type printing apparatus constructed in accordance with the preferred embodiment of the invention, while FIG. 3 is a plan view of the same apparatus. FIGS. 4 and 5 are left and right side elevational views, respectively.

As will be understood from FIG. 2, in this pen type printing apparatus, a printing paper P is fed in the X-direction by cooperation between the rubber roller (paper feed roller) 11 and pressing rollers 12,12*a*, while a pen 13 is moved in the Y-direction, so that characters, symbols, charts or the like can be printed on the paper P by a combination of reciprocal or reversible movement of the paper and pen in X and Y-directions respectively.

The movement of the pen 13 in the Y-direction is achieved by the following mechanism.

The pen 13 is a short core of an oily or aqueous ball point pen. The pen 13 is carried by a carriage 14 made of a plastic. As will be understood from the perspective view of FIG. 7 and the vertical sectional view of FIG. 8, the pen 13 is mounted to an upper part of the carriage 14 in such a manner as to be able to move into and out of contact with the rubber roller 11. A leaf spring 15 fixed to the carriage 14 engages the forward end of the pen 13 to bias the latter away from the rubber roller 11. The carriage 14 is provided at its rear end with a groove 14*a* which receives a hammer 16 made of a plastic material. A projection 16*a* formed integrally with the hammer 16 at the lower end of the latter is held in contact with the rear end of the pen 13. An oval hole 16*b* (See FIG. 8) formed in the hammer 16 receives a hammer shaft 17 having an oval cross-section. The hammer shaft 17 is received by a round hole 14*b* formed in the carriage 14 (See FIG. 7). The hammer shaft 17 is rotatably supported at its ends by the two side plates 18*a*,18*b* of the printing apparatus, as will be understood from FIGS. 2 and 3. A cylindrical holder 19 fits around the end portion of the hammer shaft 17 projected outwardly of the side plate 18*b*. The holder 19 has an integral projection 19*a* which is connected to an operating plate 21 of a solenoid 20 secured to the side surface of the side plate 18*b*. A reference numeral 22 designates a return spring for the operation plate 21.

Figure 6:
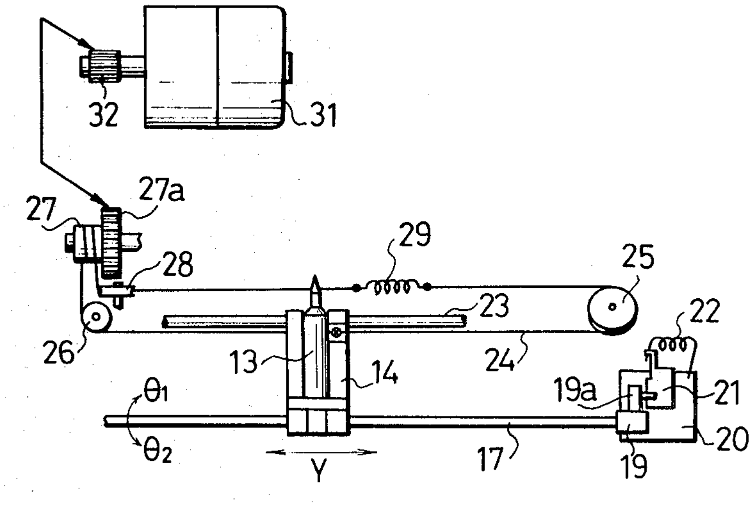
FIG. 6 is a schematic illustration of a mechanism for moving a pen in the Y-direction.
Figure 8:
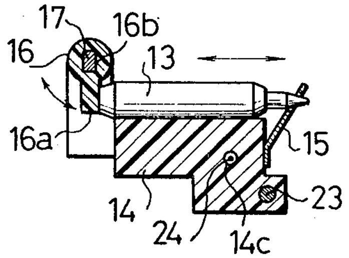
FIG. 8 is a vertical sectional view of the carriage shown in FIG. 7.
Figure 7:
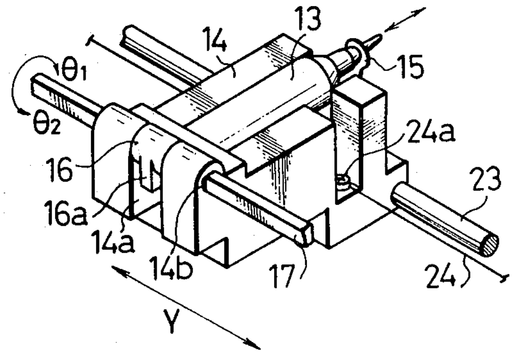
FIG. 7 is a perspective view of a carriage.

On the other hand, a round shaft 23 extending between the side plates 18*a*,18*b* is slidably received by the front lower portion of the carriage 14, as will be seen from FIGS. 3 and 7. Also, as shown in FIG. 8, the carriage 14 is provided with a hole 14*c* opening to both sides thereof. The hole 14*c* receives a wire 24 which is fixed to the carriage 14 by means of a screw 24*a* (See FIG. 7). As will be understood from the schematic illustration in FIG. 6, one side of the wire 24 is wound round a pulley 25 which is secured rotatably to the outside of the side plate 18*b* at an inclination, while the other side of the wire 24 goes around another pulley 26 which is rotatably secured to the outer surface of the side plate 18*a* horizontally and is then wound around a winding pulley 28 rotatably secured to the outer surface of the side plate 18*a*. This portion of the wire 24 then goes round still another pulley 28 which is rotatably and vertically secured to the outer surface of the side plate 18*a* and is then turned to the inside of the side plate 18*a* so as to be connected to the first-mentioned side of the wire 24 through a tension spring 29.

An idle gear 27*a* formed integrally with the winding pulley 27 is meshing with an intermediate small gear 30 provided on the side plate 18*a*, as will be most clearly seen from FIGS. 3 and 5. An intermediate large gear 30*a* integral with the small gear 30 meshes with a pinion gear 32 on the rotor shaft of a stepping motor 31 which is fixed to the inner surface of the side plate 18*a*.

The driving power of the stepping motor 31 is transmitted to the pinion gear 32 and then to the intermediate large gear 30*a* and then, through the intermediate small gear 30 integral with the large gear 30*a*, to the idle gear 27*a* which in turn drives the winding pulley 27 integral therewith. In consequence, the wire forming a closed loop is driven to shift the carriage 14 in the Y-direction along the hammer shaft 17 and the round shaft 23 serving as guide shafts (See FIGS. 6 and 7).

In the course of the sliding of the carriage in the Y-direction, when the solenoid 20 is not energized, the holder 19 and the hammer shaft 17 are rotatively biased toward $0_1$ by the action of the spring 22, as will be seen from FIG. 7, so that the hammer 16 is rotatively driven to keep its projection 16*a* away from the rear end of the pen 13, as shown in FIG. 8.

In this state, therefore, the pen 13 is biased away from the rubber roller 11 by the force exerted by the leaf spring 15, so that the pen 13 does not make any printing on the printing paper P. As the solenoid 20 is energized, the holder 19 and the hammer shaft 17 are rotated toward $0_2$ (See FIG. 7) to make the projection 16*a* of the hammer 16 push the rear end of the pen 13 thereby to project the tip end of the pen 13 toward the rubber roller 11 to enable the pen 13 to effect a printing on the printing paper P.

In this state, therefore, any desired character, symbol, chart or the like can be scribed on the printing paper P, by suitably driving the carriage 14 and/or the printing paper P in accordance with a writing instruction.

The feed of the printing paper P is made by a mechanism explained hereinunder. The aforementioned rubber roller 11 is formed of an NBR rubber fixed to the end of a rotary shaft 11*a*, and has a diameter approximating 10 mm. As will be understood from FIG. 3, the rotary shaft 11*a* is rotatably supported at both of its ends by the side plates 18*a*,18*b*. An idle gear 41 is fixed to one end portion of the rotary shaft 11*a* projecting outwardly from the side plate 18*b*, and meshes with a rotatable small intermediate gear 42 provided on the outer surface from the side plate 18*b*, as shown in FIGS. 3 and 4. A large intermediate gear 42*a* integral with the small gear 42 meshes with a pinion gear 44 attached to the rotor shaft of a stepping motor 43. The stepping motor 43 is secured to the back side of the side plate 18*b* coaxially with the aforementioned stepping motor 31.

Figure 10:
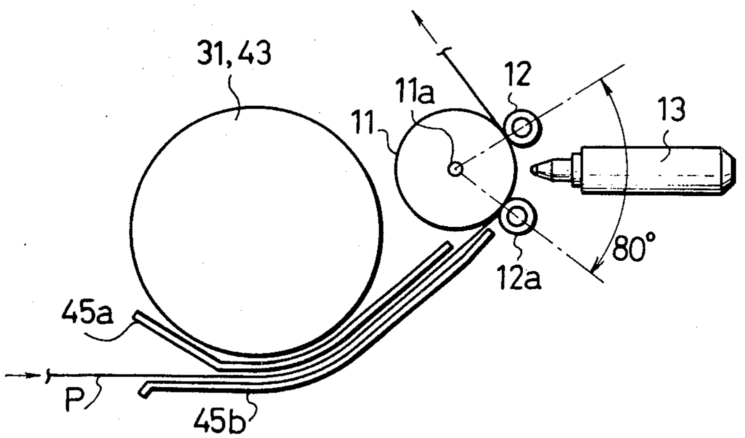
FIG. 10 is an illustration of the paper feed mechanism.

As will be seen from FIG. 10, a pair of guide plates 45*a*,45*b* are laid beneath the stepping motors 31,43 and extend to the area under the rubber roller 11. The printing paper P is fed to the rubber roller 11 through the gap between these guide plates 45*a*,45*b*.

Figure 9:
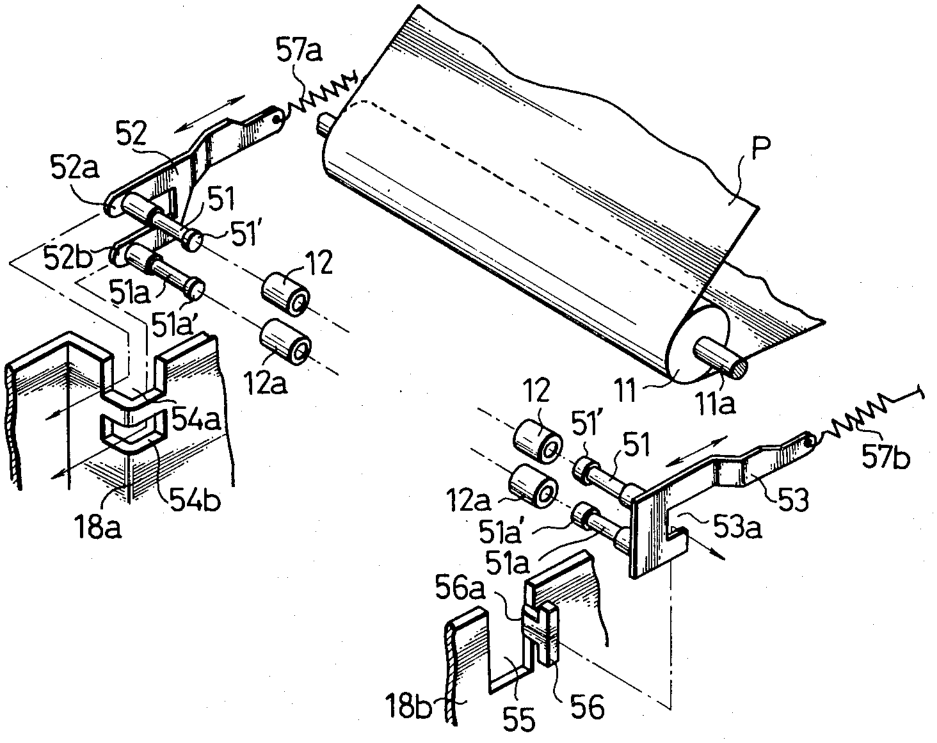
FIG. 9 is an exploded perspective view of a paper feed mechanism.

On the other hand, as will be most clearly seen from the exploded view in FIG. 9, the pressing roller 12 is separated into upper and lower rollers 12 and 12*a* at both ends of the rubber roller 11. The upper roller 12 and the lower roller 12*a* are made from brass rings and have outside diameters of 3.5 mm and 2.5 mm, respectively. The upper pressing rollers 12 are supported by separate short roller shafts 51 provided at respective axial ends of the rubber roller 11, while the lower pressing rollers 12*a* are supported by separate short roller shafts 51*a* provided at respective axial ends of the rubber roller 11. The pressing rollers 12,12*a* have inside diameters slightly greater than the outside diameters of the heads 51′,51*a*′ of the roller shafts 51,51*a*. The pressing rollers 12,12*a* fit on the roller shafts 51,51*a* past the heads 51′,51*a*′. The pressing rollers 12,12*a* are pressed against the surface of the rubber roller 11, and this pressing force prevents the pressing rollers 12,12*a* from dropping from the small diameter portions of the roller shafts 51,51*a*. One of the combinations of the roller shafts 51,51*a* is secured to a holding plate 52 while the other is secured to another holding plate 53.

As will be seen from FIG. 9, the holding plate 52 has a bifurcated form with two branches 52*a*,52*b* which fixedly carry the roller shafts 51,51*a*, respectively. The branches 52*a*,52*b* are received within two notches 54*a*,54*b* formed on the stepped portion of the side plate 18*a*. The roller shafts 51,51*a* and the pressing rollers 12,12*a* are projected inwardly through these notches 54*a*,54*b*. Since the branches 52*a*,52*b* are received by the notches 54*a*,54*b*, the holding plate 52 is carried by the side plate 18*a* in such a manner so as to be able to move a small distance toward and away from the rubber roller 11, i.e. in the direction of the arrow shown in FIG. 9 adjacent to the holding plate 52.

The other holding plate 53 has a central rectangular notch 53*a* as shown in FIG. 9. The notch 53*a* receives a neck portion 56*a* of an engaging tab 56 formed by bending the notched portion 55 of the side plate 18*b*. This holding plate 53 is held by the side plate 18*b* in such a manner so as to be able to move a small distance toward and away from the rubber roller 11, i.e. in the direction of arrow shown in FIG. 9 adjacent to the holding plate 53. The roller shafts 51,51*a* secured to the holding plate 53 project inwardly of the side plate 18*b* through the notch 55 in the latter, together with the pressing rollers 12,12*a*. Springs 57*a* and 57*b* are connected to the rear ends of the holding plates 52 and 53, respectively. The spring 57*a* is retained by a bent tab 18*c* (See FIG. 3) of the side plate 18*a*, while the spring 57*b* is retained by a bent tab 18*d* (See FIG. 3) of the side plate 18*b*. The pressing rollers 12 and 12*a* are brought into pressure contact at a constant pressure with respective axial ends of the rubber roller 11.

As will be seen from FIG. 10, the distance between the upper pressing roller 12 and the lower pressing roller 12*a* is so selected that the angle formed between two lines interconnecting the axes of these pressing rollers 12,12*a* to the axis of the rubber roller 11 is 80°, and the pen 13 is so positioned that its tip end is directed toward the area intermediate the pressing rollers 12,12*a*. This angle may be selected to fall between about 60° and 120°. Namely, any angle falling within the above-mentioned range is practically adoptable.

The paper feed mechanism heretofore described operates in a manner explained hereinunder.

The rubber roller 11 is driven by the operation of the stepping motor 13 in one and the other directions. Namely, the driving power of the stepping motor 43 is transmitted from the pinion gear 44 to the intermediate large gear 42*a* and, through the intermediate small gear 42 integral with the latter, to the idle gear 41 which in turn drives the rubber roller 11.

On the other hand, the printing paper P is fed from the rear side of the apparatus into the gap between two guide plates 45*a*,45*b* and is introduced to the area beneath the rubber roller 11. The rubber roller 11 then cooperates with the lower pressing rollers 12*a* in clamping the printing paper P therebetween. The printing paper is then clamped between the rubber roller 11 and the upper pressing rollers 12 and is fed upwardly.

Then, a writing is made by the tip of the pen 13 on the portion of the printing paper P between the upper and lower pressing rollers 12,12*a*. Namly, by a suitable control of the operation of two step motors 31,43 in one and the other directions and the pushing of the pen 13 in combination in accordance with the printing instruction, any desired character, symbol and chart are drawn on the printing paper P.

As has been described, according to the invention, four pressing rollers 12,12*a* of small diameters are rotatably carried by separate short rollers shafts 51,51*a* independently provided at respective axial ends of the rubber roller (paper feed roller) 11 so as to clamp the printing paper P by cooperation between the pressing rollers 12,12*a* and the rubber roller 11. In the printing apparatus of the invention, therefore, no obstruction such as a roller shaft, pressing rollers or the like which would impede the visual check of the state of printing exists in the writing portion of the recording paper P, thereby to permit a visual check of the state of the printing. In addition, the contamination of the recording paper, which is often experienced in the conventional apparatus due to contact of the pressing rollers with the printed line immediately after the printing, is completely avoided. Furthermore, since the printing paper P is pressed against the rubber roller 11 by two pressing rollers 12,12*a* at each axial end of the rubber roller, the force for feeding the printing paper P is exerted on four points in total to ensure a more stable upward feed of the printing paper P to avoid any offset or deviation of the printing paper P on the printing apparatus.

What is claimed is:

1. A pen type apparatus comprising:
(a) a paper feed roller adapted to be rotatively driven by a motor;
(b) a pair of side plates rotatably holding respective end portions of said paper feed roller;
(c) upper and lower roller shafts of a small length extending inwardly from each respective side plate so as to extend in parallel with said paper feed roller, both upper roller shafts being coaxial and both lower roller shafts being coaxial;
(d) pressing rollers of small diameters being rotatably carried by respective roller shafts;
(e) spring means for biasing each of said pressing rollers into pressure contact with said paper feed roller with a substantially equal force;
(f) a printing paper clamped at both of its marginal edges between said paper feed roller and said pressing rollers; and
(g) a pen carried by a carriage movable transversely of said printing paper and adapted to make a printing operation by a combination of the shifting of said carriage, feed of said printing paper and projection of said pen.

2. A pen type printing apparatus as claimed in claim 1, wherein the printing is made on the substantially central region of said recording paper pressed between the four pressing rollers.

3. A pen type printing apparatus as claimed in claim 1, further comprising:
(a) roller shaft holding means secured respectively to each of said side-plates and fixedly carrying said upper roller shaft and said lower roller shaft; and
(b) means for supporting each of said roller shaft holding means in such a manner as to permit a sliding motion of said roller shaft holding means toward and away from said paper feed roller.

4. A pen type printing apparatus as claimed in claim 3, wherein each of said roller shafts has a reduced diameter portion smaller that the inside diameter of said respective pressing roller for receiving it, so that each said pressing roller is prevented, due to the pressure contact with said paper feed roller, from falling from its respective roller shaft.

5. A pen type printing apparatus having a paper feed roller adapted to be driven rotatively to feed a printing paper, and a pen carried by a carriage movable transversely of said printing paper, said pen being disposed to be opposite said printing paper so as to be able to print data on said printing paper, further comprising:

means for supporting said pen directly and slidably on said carriage, a spring acting between said pen and said carriage to bias the tip end of said pen away from said paper feed roller, a pen pushing member rotatably mounted on said carriage and contacting the rear end portion of said pen, and driving means extending over the entire region of shift of said carriage for pushing said pen towards said paper feed roller.

6. An apparatus for printing on a paper wrapped partially around a paper-feed roller adapted to be rotated to move the paper; comprising means including a pair of short roller shafts held in a position so as to be adjacent each respective margin of said paper for holding said paper to said paper-feed roller, each of said pair of roller shafts including an upper shaft arranged coaxially with one another and a lower shaft arranged coaxially with one another; respective pressing rollers held rotatably on each of said shafts; and means including springs connected to said pair of roller shafts for urging each of said four pressing rollers against said paper-feed roller with substantially equal force.

7. An apparatus accoding to claim 6, further including a carriage movable transversely across said paper-feed roller and carrying a pen adapted to be moved towards said paper-feed roller to print on a paper held thereagainst at positions between said pressing rollers.

8. An apparatus accordind to calim 7, said pressing rollers of each of said pair of roller shafts being spaced apart over an arc of said paper-feed roller of between 60° and 120°.

9. An apparatus according to claim 8, said arc being approximately 80°.

10. An apparatus according to claim 6, said pressing rollers of each said pair of roller shafts being spaced apart over an arc of said paper-feed roller of between 60° and 120°.

11. An apparatus according to claim 10, said arc being approximately 80°.

12. An apparatus according to claim 6, said urging means including a respective holding plate connected to each said pair of roller shafts and a respective spring connected to each said holding plate.

* * * * *